US008356132B2

(12) United States Patent
Kwan

(10) Patent No.: US 8,356,132 B2
(45) Date of Patent: Jan. 15, 2013

(54) POSITION SENSING SYSTEM FOR A KVM SWITCH

(75) Inventor: Derek Kwan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1518 days.

(21) Appl. No.: 11/455,973

(22) Filed: Jun. 20, 2006

(65) Prior Publication Data
US 2007/0074179 A1 Mar. 29, 2007

(30) Foreign Application Priority Data
Aug. 30, 2005 (CA) ...................................... 2517999

(51) Int. Cl.
*G06F 13/00* (2006.01)
(52) U.S. Cl. .............. 710/316; 710/38; 710/62; 710/72; 710/73; 710/100; 710/305; 710/306; 250/231.13; 250/231.14; 250/231.18; 324/207.25; 345/156; 345/163; 345/168; 702/150; 702/151; 702/163; 717/136
(58) Field of Classification Search .................... 710/316
See application file for complete search history.

(56) References Cited

U.S. PATENT DOCUMENTS

| 4,766,307 A | * | 8/1988 | Pelgrom et al. | 250/208.3 |
|---|---|---|---|---|
| 5,131,166 A | * | 7/1992 | Weber | 33/832 |
| 5,195,746 A | * | 3/1993 | Boyd et al. | 463/37 |
| 5,341,702 A | * | 8/1994 | Chaney et al. | 74/821 |
| 5,570,301 A | * | 10/1996 | Barrus | 702/150 |
| 5,784,282 A | * | 7/1998 | Abitbol et al. | 700/186 |
| 5,796,386 A | * | 8/1998 | Lipscomb et al. | 345/156 |
| 5,909,208 A | * | 6/1999 | Blomdahl | 345/156 |
| 6,060,880 A | * | 5/2000 | Guyot et al. | 324/207.2 |
| 6,111,580 A | * | 8/2000 | Kazama et al. | 715/863 |
| 6,351,261 B1 | * | 2/2002 | Reichlen et al. | 345/427 |
| 6,557,170 B1 | | 4/2003 | Wilder et al. | 725/130 |

(Continued)

FOREIGN PATENT DOCUMENTS

JP 2003163673 A 6/2003
(Continued)

OTHER PUBLICATIONS

"The Internet Chair" by Michael Cohen, International Journal of Human-Computer Interaction, vol. 15, No. 2, pp. 297-311, 2003.*

*Primary Examiner* — Steven Snyder
(74) *Attorney, Agent, or Firm* — Patrick J. Daugherty; Driggs, Hogg, Daugherty & Del Zoppo Co., LPA

(57) ABSTRACT

A position sensing system controls selection of channels in a KVM switch having a plurality of channels. The system has a sensor interface for receiving a sensor reading indicating a current position of a position movable component. Each position of the movable component is associated with one of the plurality of channels. The position sensing system also includes a position component for selecting channels of the KVM switch according to the sensor reading. The position component comprises a position definition component and a translation component. The definition component identifies one of the channels corresponding to the sensor reading based on one of a position definition. Each position definition provides sensor readings corresponding to the positions associated with one of the channels. The translation component generates a signal for selecting the determined channel at the KVM switch. This signal is provided to the KVM switch to switch the KVM channel.

6 Claims, 5 Drawing Sheets

U.S. PATENT DOCUMENTS

| | | | |
|---|---|---|---|
| 6,697,905 B1 | 2/2004 | Bealkowski | 710/316 |
| 6,857,005 B2 | 2/2005 | Kistler et al. | 709/203 |
| 2003/0126323 A1 | 7/2003 | Ferguson et al. | 710/63 |
| 2003/0222801 A1* | 12/2003 | Ying et al. | 341/26 |
| 2004/0012385 A1* | 1/2004 | Kirkpatrick, II | 324/207.21 |
| 2004/0015980 A1 | 1/2004 | Rowen et al. | 719/310 |
| 2005/0011738 A1* | 1/2005 | Smith et al. | 200/85 R |
| 2005/0190150 A1* | 9/2005 | Drake | 345/156 |
| 2007/0038939 A1* | 2/2007 | Challen et al. | 715/734 |

FOREIGN PATENT DOCUMENTS

| | | |
|---|---|---|
| JP | 2004220160 A | 8/2005 |

\* cited by examiner

POSITION SENSING SYSTEM FOR A KVM SWITCH

FIELD OF THE INVENTION

The present invention relates to the field of keyboard video mouse (KVM) switches for computing devices.

BACKGROUND OF THE INVENTION

In complex computing environments a user may operate multiple computing devices, multiple input devices and multiple output devices. To reduce the number of input and output devices used for operation of the multiple computing devices, a keyboard video mouse (KVM) switch may be used to control the computing devices to which the input and output devices are connected. As a result, multiple computing devices may be controlled by a single contingent of input and output devices.

KVM switches control the selection of a channel through either a mechanical or electrical switching mechanism. Each channel in the KVM switch is connected to one of the computing devices. Channels in a mechanical KVM switch are changed by the physical manipulation of a manual switch or push button. An electrically controlled KVM switch may be operated through predefined keyboard sequences associated with each of the channels for channel selection. If the user wants to cycle through all of the channels of the KVM switch, such frequent switching by way of a mechanical operation or the input of different keyboard sequences each time a change is desired can be cumbersome.

SUMMARY OF THE INVENTION

In accordance with an exemplary embodiment there is provided a position sensing system for controlling selection of channels in a KVM switch having a plurality of channels, the position sensing system comprising: a sensor interface for receiving a sensor reading indicating a current position of a position movable component, each position of the position movable component being associated with one of the plurality of channels; and a position component for selecting channels of the KVM switch according to the sensor reading, the position component comprising: a position definition component for identifying one of the plurality of channels corresponding to the sensor reading based on one of a plurality of position definitions, each of the plurality of position definitions providing sensor readings corresponding to the positions associated with one of the plurality of channels; and a translation component for generating a signal for selecting the determined channel at the KVM switch, the signal being provided to the KVM switch.

In accordance with an exemplary embodiment there is provided a position controlled KVM switch comprising: a KVM switch having a plurality of channels, each of which is selectable by an access key; a control component in communication with the KVM switch, the control component capable of receiving a sensor reading indicating a current position of a position movable component; and a position component for selecting channels of the KVM switch according to the sensor reading, the position component comprising: a position definition component for identifying one of the plurality of channels corresponding to the sensor reading based on a position definition, each channel having a position definition identifying a position of the position movable component with corresponding sensor readings; and a translation component for generating a signal representing the access key for the determined channel, the signal being provided to the KVM switch for channel selection.

In accordance with an exemplary embodiment there is provided a system for selection of one of a plurality of computing devices for control by an output device according to a position of a position movable component, the system comprising: a sensor for detecting the position movable component to form a sensor reading providing an indication of a current position of the position movable component; a KVM switch having a plurality of channels, each of which is connectable to one of the plurality of computing devices, each of the plurality of channels is selectable by an access key; a control component in communication with the KVM switch for providing selection of the plurality of channels and in communication with the sensor for receiving the sensor reading; and a position component for selecting one of the plurality of channels of the KVM switch according to the sensor reading, the position component comprising: a position definition component for identifying one of the plurality of channels corresponding to the sensor reading based on a position definition, each channel having a position definition identifying a position of the position movable component with corresponding sensor readings; and a translation component for generating a signal representing the access key for the determined channel, the signal being provided to the KVM switch for channel selection.

In accordance with an exemplary embodiment there is provided a method of controlling selection of channels in a KVM switch having a plurality of channels according to a position of a position movable component, the method comprising: receiving a current sensor reading indicating a current position of the position movable component, each position of the position movable components being associated with one of the plurality of channels; identifying one of the plurality of channels corresponding to the current sensor reading based on one of a plurality of position definitions, each of the plurality of position definitions providing sensor readings corresponding to the positions associated with one of the plurality of channels; generating a signal for selecting the determined channel at the KVM switch; and transmitting the signal to the KVM switch.

A position sensing system controls selection of channels in a KVM switch having a plurality of channels. The position sensing system has a sensor interface for receiving a sensor reading indicating a current position of a position movable component. Each position of the position movable component is associated with one of the plurality of channels. The position sensing system also includes a position component for selecting channels of the KVM switch according to the sensor reading. The position component comprises a position definition component and a translation component. The position definition component identifies one of the plurality of channels corresponding to the sensor reading based of one of a plurality of position definitions. Each of the plurality of position definitions provides sensor readings corresponding to the positions associated with one of the plurality of channels. The translation component generates a signal for selecting the determined channel at the KVM switch. This signal is provided to the KVM switch to effect switching of the KVM channel.

DETAILED DESCRIPTION

Figure 1:
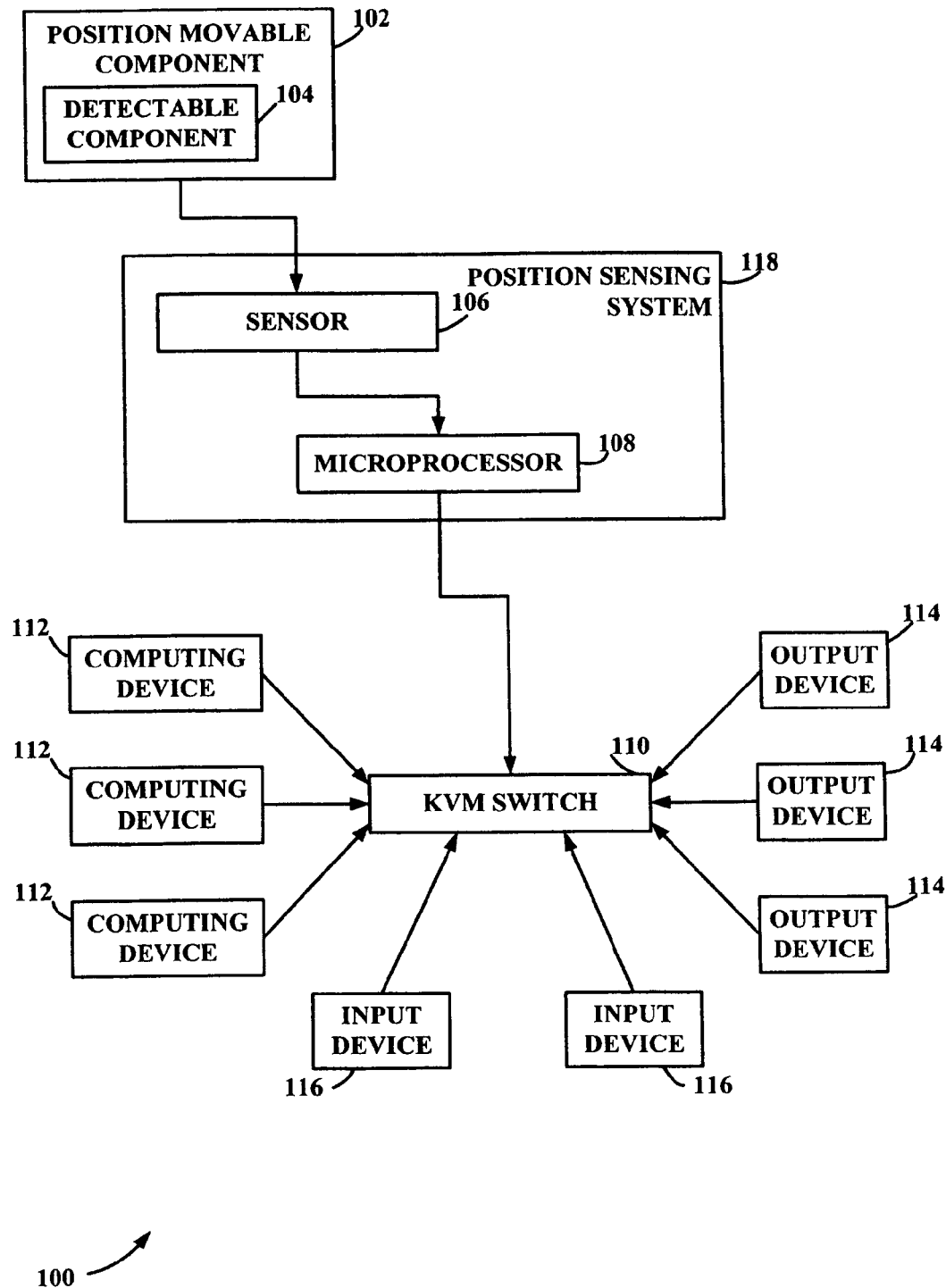
FIG. 1 illustrates an exemplary computing environment in which a position sensing system for a KVM switch may be implemented.

FIG. 1 illustrates an exemplary computing environment 100 in which a position sensing system 118 for a KVM switch may be implemented.

A KVM switch 110 is connected with multiple computing devices 112, multiple input devices 116 and multiple output devices 114. The KVM switch 110 connects a set of input and output devices 114,116 with one of the computing devices 112. The relationship in the KVM switch 110 is often one to many, where a set of input and output devices 114,116 may be considered to be a single entity. In the case where one set of input and output devices 114,116 (e.g. one video monitor, one keyboard and one mouse) are to be used to control multiple computing devices 112 (e.g. personal computers), then the relationship in the KVM switch 110 is one set of input and output device 114,116 to many computing devices 112. The KVM switch 110 has multiple channels, each of which is assigned to one of the multiple entities so that selection of the channel connects the singular entity with the one of the multiple entities corresponding to the selected channel. In the above example, each of the computing devices 112 is assigned a channel in the KVM switch 110.

The KVM switch 110 may also be configured such that only some of the input and output devices 114,116 are switched. For example, the KVM switch 110 may be configured so that each computing device 112 has a separate output device 114 but all computing devices 112 share the same input devices 116 (or vice versa with separate input devices 116 and a single output device 114).

In the case where there are more computing devices 112 then there are channels in the KVM switch 110, multiple KVM switches may be cascaded together. In such a cascaded configuration the KVM switch 110 in direct communication with the position sensing system 118 may act as a management switch. In the role of a management switch, the channels of the KVM switch 110 are each connected to an additional KVM switch. The channels of each additional KVM switch may then be connected to other KVM switches or computing devices 112.

Channels of the KVM switch 110 are selected by the position sensing system 118. The position sensing system 118 includes a microprocessor 108, and a sensor 106 (and possibly a detectable component 104) separate from the KVM switch 110. The sensor 106 may also be packaged with the detectable component 104, both of which may be provided separate from the position sensing system 118. The KVM switch 110 may be any existing KVM switch capable of accepting external electronic input (e.g. keyboard sequences). Alternatively, the KVM switch 110 may be packaged with the position sensing system 118, thus forming a position sensing KVM switch. Each of the devices connected to the channels of the KVM switch 110 (e.g. computing devices 112) may be provided with an indicator (e.g. light emitting diode), not shown, to provide an indication of the device that is currently selected or activated.

The microprocessor 108 receives an input from the sensor 106, which detects a position of a position moveable component 102 through the use of the detectable component 104 associated with the position movable component 102. The position movable component 102 is a component that is movable by the user with respect to the input devices 116, output devices 114 and computing devices 112. The detectable component 104 is associated with the position moveable component 102 to enable the sensor 106 to determine the position of the position movable component 102.

Figure 5:
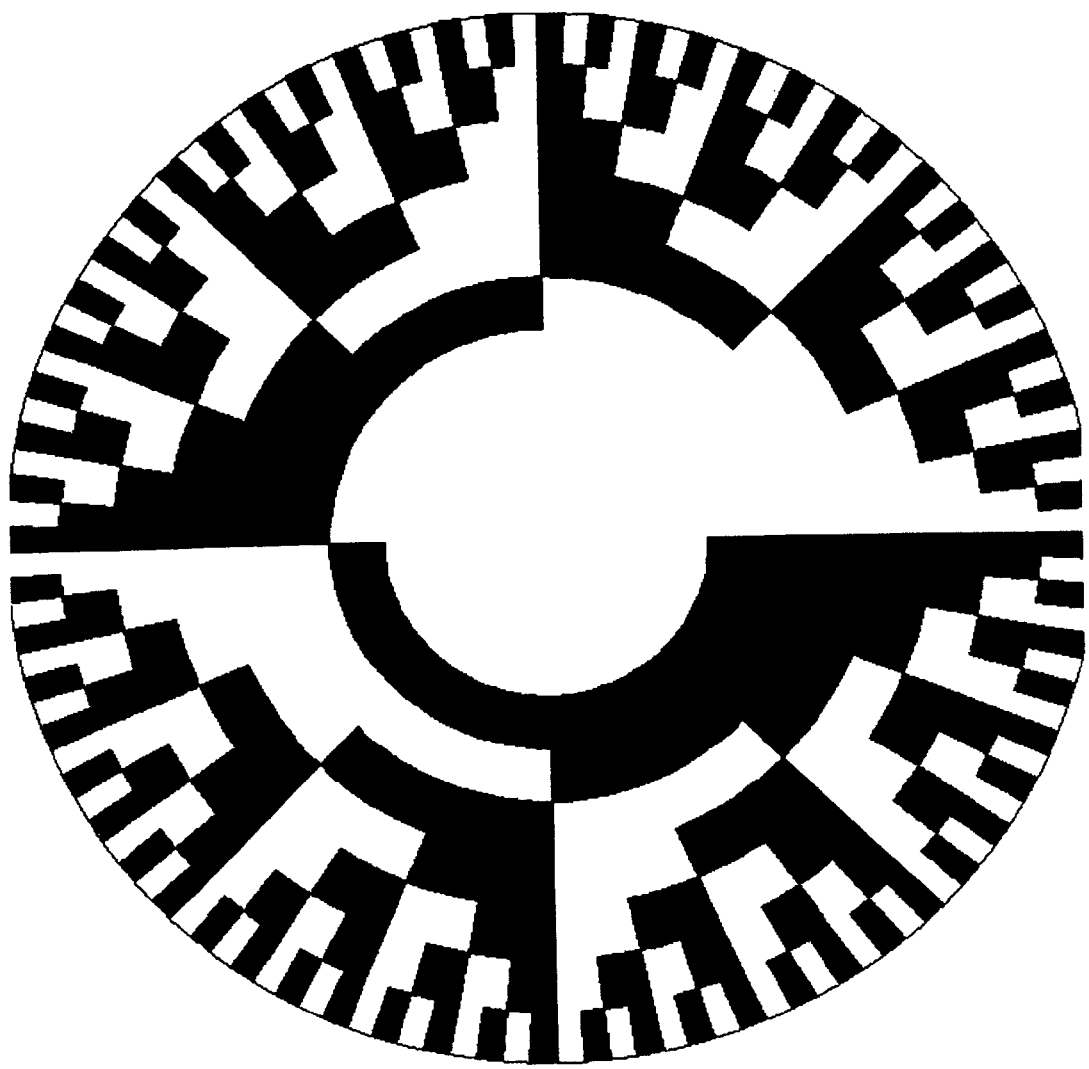
FIG. 5 is an optically detectable component that may be used in connection with the position sensing system.

The position movable component 102 may be a chair for which the detectable component 104 is an optically detectable disk with a position distinguishable via black and white segments as shown in FIG. 5. The chair may be mounted to a workspace to simplify calibration of the position of the chair against the position of the computing devices 112. The sensor 106 for this case may be an optical emitter and detector that emits an optical signal directly at the optical disk and detects reflections. These reflections are used to determine the position and/or rotation of the chair. The sensor 106 may also be used to detect when the chair is tilted. The tilt may be used to switch to computing devices 112 located in an upper row of a stacked configuration.

Alternatively, the position movable component 102 and one of the output devices 114 may be combined in the form of a heads up display. Multiple detectable components 104 and sensors 106 may be positioned in the environment with the heads up display to determine the position and orientation of the head up display. For example, the heads up display may be serving as an output device 114 in an environment with multiple computing devices 112. The detectable components 104 and sensors 106 may be used to determine the computing device 112 that the heads up display is oriented towards or some other virtual position of the heads up display. The channel is switched so that information from this corresponding computing device 112 is displayed on the heads up display. The detectable components 104 may be mounted on the heads up display and may take a form similar to the optical disk in FIG. 5. One or more sensors 106 may be positioned around the environment to emit an optical signal and obtain reflections of the optical signal. The sensor 106 may also take the form of one or more cameras that capture an image of the user with the heads up display. Such image(s) may then be processed to isolate the heads up display and determine its orientation. Alternatively, the detectable component 104 may take the form of a gyroscope provided on the heads up display to detect movement which may be used to determine the position of the heads up display.

Alternatively, the position movable component 102 and the detectable component 104 may take the form of a standard office chair with the sensor 106 being a pressure sensitive floor mat. Movement of the chair on the pressure sensitive floor mat is detected and the new position of the chair provided to the microprocessor 108.

Alternatively, the position movable component 102 may be a sliding keyboard tray capable of moving along the length of a work surface on which the computing devices 112, input devices 116 and output devices 114 are situated. The sensor 106 may be a series of optical sensors on the keyboard tray detecting the stationary detectable component 104 whose form is a straight black and white strip developed in a manner similar to the optical disk in FIG. 5. The sensors 106 may also be a series of Hall effect sensors positioned along a rail on which the keyboard tray moves with the detectable components 104 being magnets attached to the keyboard tray.

The sensor 106 detects the detectable component 104 and provides this information to the microprocessor 108. The microprocessor 108 interprets the raw sensed information from the sensor 106 to determine a position definition that corresponds with the sensor reading indicating the position of the position movable component 102. Based on the determined position definition, the microprocessor determines the KVM channel that should be activated and sends a signal to the KVM switch 110 to switch the channels accordingly.

During initialization of the position sensing system 118, the microprocessor 108 may remember a current position (stateful) or it may not remember the current position (stateless) of the detectable component 104 and the position movable component 102 as well as the channel selected. An example of a position movable component 102 and detectable component 104 combination that is stateful is a chair and pressure sensitive pressure mat whereas an example of a stateless combination is a chair with a strip of alternating black and white bars and an optical sensor.

Figure 2:
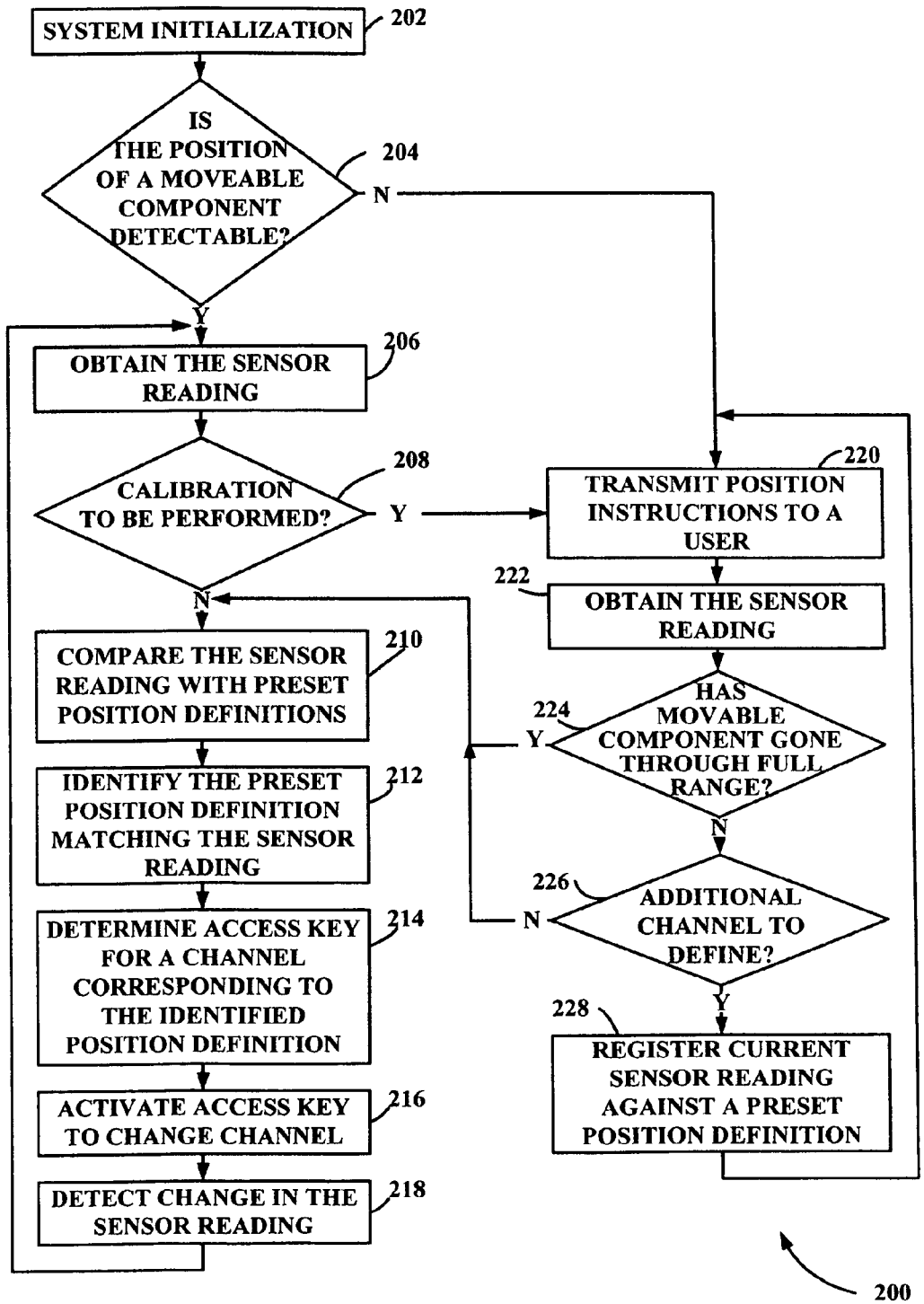
FIG. 2 is a flow diagram illustrating a method of statefully controlling a KVM switch based on a sensed position of a user.

FIG. 2 is a flow diagram illustrating a method 200 of operating a stateful KVM switch based on a sensed position of the position movable component 102. The method 200 is described from the perspective of the position sensing system 118.

The position sensing system is initialized in step 202. System initialization may involve obtaining the last known position of the position movable component 102 as well as checking or activating the various channels of the KVM switch 110. Checking the KVM switch channels may involve determining the number of active channels and determining if a position definition has been created for each active channel.

In step 204 it is determined if the position of the position movable component 102 is detectable. If the position cannot be detected then the sensor readings of the position definitions are revised (or calibrated) in steps 220 to 228. If the position can be detected then the sensor reading is obtained in step 206.

In step 208 a determination is made regarding whether or not calibration is to be performed. Calibration is performed when a request for calibration is made by the user. Another situation in which calibration may be performed is when a new channel is added (e.g. a KVM switch is added in a cascaded configuration, a new computing device 112 is connected to a channel of the KVM switch 110, etc.). If step 206 determines that calibration is to be performed then the sensor readings are calibrated in steps 222 to 228. If calibration of the sensor readings in the position definitions do not need to be performed then selection of a KVM switch channel is performed in steps 210 to 218 based on the sensor reading.

The sensor reading is compared with position definitions in step 210. The position definitions may be determined prior to using the position sensing system 118. Alternatively, these position definitions may be set during the calibration process of steps 220 to 228. The range of readings of the sensor 106 is considered and this range is then aligned with physical or virtual locations representing the different channels of the KVM switch 110. The position of the computing devices 112, the input devices 116 or the output devices 114 may be used as the physical locations representing the KVM switch channels. The range of sensor readings are then correlated to the physical positions representing the KVM switch channels to form the position definitions.

The position definition corresponding to the current sensor reading is identified in step 212. The identified position definition determines the KVM switch channel that will be activated.

Each channel in the KVM switch 110 has an access key. The access keys are the signals provided to the KVM switch 110 to change from the current channel to the channel identified by the access key. If the KVM switch 110 is an existing KVM switch for which channel selection is based on input keyboard sequences then the access key may be the keyboard sequence corresponding to the channel that is to be activated.

The access key for the KVM switch channel identified in step 212 is determined in step 214. This access key is then activated to change the channel in step 216.

Detection of a change in the sensor reading in step 218 causes steps 206 to 228 to be repeated.

If the position of the position movable component 102 is not detectable (step 204) or calibration of the sensor reading is to be performed for some other reason (step 208), then position instructions are transmitted to the user in step 220. These position instructions may be instructions to request the user to position the position movable component 102 in the area where the first of the KVM switch channels would be selected or in the area of any other one of the KVM switch channels. The instructions may be coordinated with the indicators provided with the devices connected to the KVM switch channels. When instructions are provided to the user to position the movable component 102 in a particular area, an indicator in that area may be activated to indicate selection of that channel.

After the instructions are transmitted to the user, the sensor reading is obtained in step 222 to calibrate the sensor reading with the position of the appropriate channel.

In step 224 it is determined if the position movable component 102 has moved through its full range of motion, indicating that the position movable component 102 is in the original position. For example, if the position movable component 102 is a chair then the full range of motion would be a rotation of 360°. If the position movable component 102 has been moved through the full range of motion, then calibration is not required and the sensor reading is compared with position definitions in step 210. If the position movable component has not moved through the full range of motion, then it is determined in step 226 if there are any channels in the KVM switch 110 that are not defined. In particular, step 226 may determine whether or not the channel that was identified in step 222 as being calibrated is defined or not. If the channel is not defined or is to be redefined then the current sensor reading is registered against the position definition corresponding to the channel in step 228. After this, position instructions are again transmitted to the user in step 220, this time the instructions are for defining the sensor readings for a different channel. The process then continues to step 222.

If all channels in the KVM switch 110 have been defined and calibrated with sensor readings then calibration stops and the sensor reading is compared with position definitions in step 210.

Figure 3:
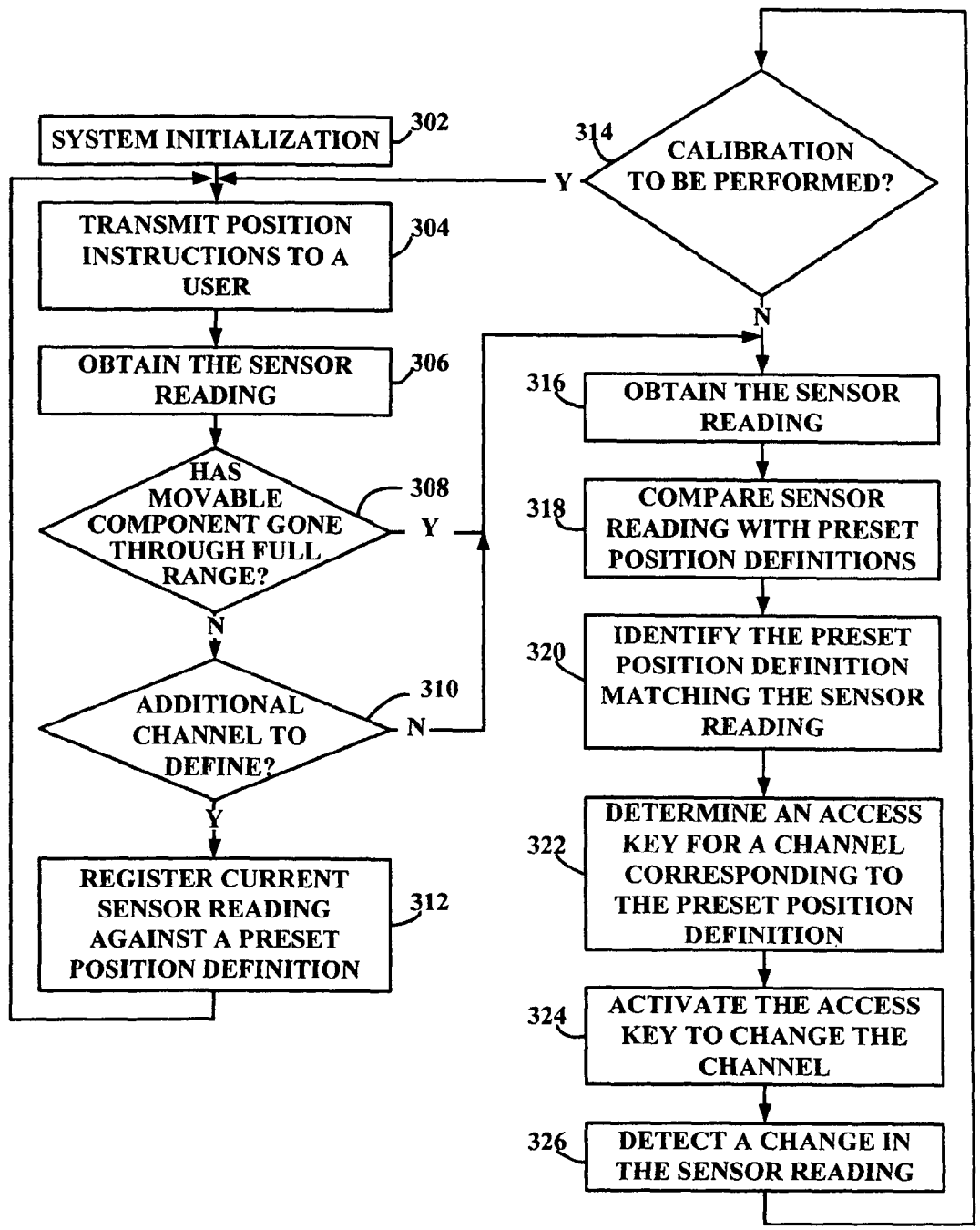
FIG. 3 is a flow diagram illustrating a method of statelessly controlling a KVM switch based on a sensed position of a user.

FIG. 3 is a flow diagram illustrating a method 300 of operating a stateless KVM switch based on a sensed position of the position movable component 102. The method 300 is described from the perspective of the position sensing system 118. The method or program can be contained in the flash memory of the microprocessor, which flash memory is well known in the art. Alternatively, the method or program may be contained in a separate memory (either flash or otherwise) associated with the microprocessor.

The position sensing system is initialized in step 302. System initialization may involve checking or activating the various channels of the KVM switch 110. Checking the KVM switch channels may involve determining the number of active channels and whether or not a position definition has been created for each channel.

Since the position sensing system 118 of this method 300 is stateless, calibration is performed every time the system starts. Position instructions are transmitted to the user in step 304. These position instructions may be instructions to request the user to position the position movable component 102 in the area where the first of the KVM channels would be selected or in the area of any other one of the KVM switch channels. The instructions may be coordinated with the indicators provided with the devices connected to the KVM switch channels. When instructions are provided to the user to position the position movable component 102 in a particular area, an indicator in that area may be activated to indicate selection of that channel.

After the instructions are transmitted to the user, the sensor reading is obtained in step 306 to calibrate the sensor reading with the position of the appropriate channel.

In step 308 it is determined if the position movable component 102 has moved through its full range of motion, indicating that the position movable component 102 is in the original position. For example, if the position movable component 102 is a chair then the full range of motion would be a rotation of 360°. If the position movable component 102 has moved through the full range of motion, then calibration is not required and the sensor reading is obtained in step 316. If the position movable component has not moved through the full range of motion, then it is determined in step 310 if there are any channels in the KVM switch 110 that have not been defined. In particular, step 310 may determine whether or not the channel that was identified in step 304 to be calibrated is defined or not. If the channel is not defined or is to be redefined then the current sensor reading is registered against the position definition corresponding to the channel in step 312. After this, position instructions are again transmitted to the user in step 304, this time the instructions are for defining the sensor readings for a different channel. The process then continues to step 306.

The sensor reading is obtained in step 316 after it has been determined that the position movable component has moved through the full range of motion (step 308), all channels have been defined (step 310) or calibration is not to be performed (step 314). After the sensor reading has been obtained then selection of a KVM switch channel is performed in steps 318 to 326 based on the sensor reading.

The sensor reading is compared with position definitions in step 318. The position definitions are determined prior to using the position sensing system or during system calibration. The range of readings of the sensor 106 is considered and this range is then aligned with physical locations representing the different channels of the KVM switch 110. The location of the computing devices 112, the input devices 116 or the output devices 114, may be used as the physical locations representing the KVM switch channels. The range of sensor readings are then correlated to the physical locations representing the KVM switch channels to form the position definitions.

The position definition corresponding to the current sensor reading identified in step 320. The identified position definition determines the KVM switch channel that will be activated.

Each channel in the KVM switch 110 has an access key. The access keys are the signals provided to the KVM switch to change from the current channel to the channel identified by the access key. If the KVM switch 110 is an existing KVM switch for which channel selection is based on input keyboard sequences then the access key may be the keyboard sequence corresponding to the channel that is to be activated.

The access key for the KVM switch channel identified in step 320 is determined in step 322. This access key is then activated to change the channel in step 324.

Detection of a change in the sensor reading in step 326 causes step 314 to determine if calibration of the sensor reading is to be performed. If calibration is to be performed then steps 304 to 312 are repeated to calibrate the sensor reading. If calibration is not to be performed then steps 316 to 326 are repeated to change the KVM switch channel.

Figure 4:
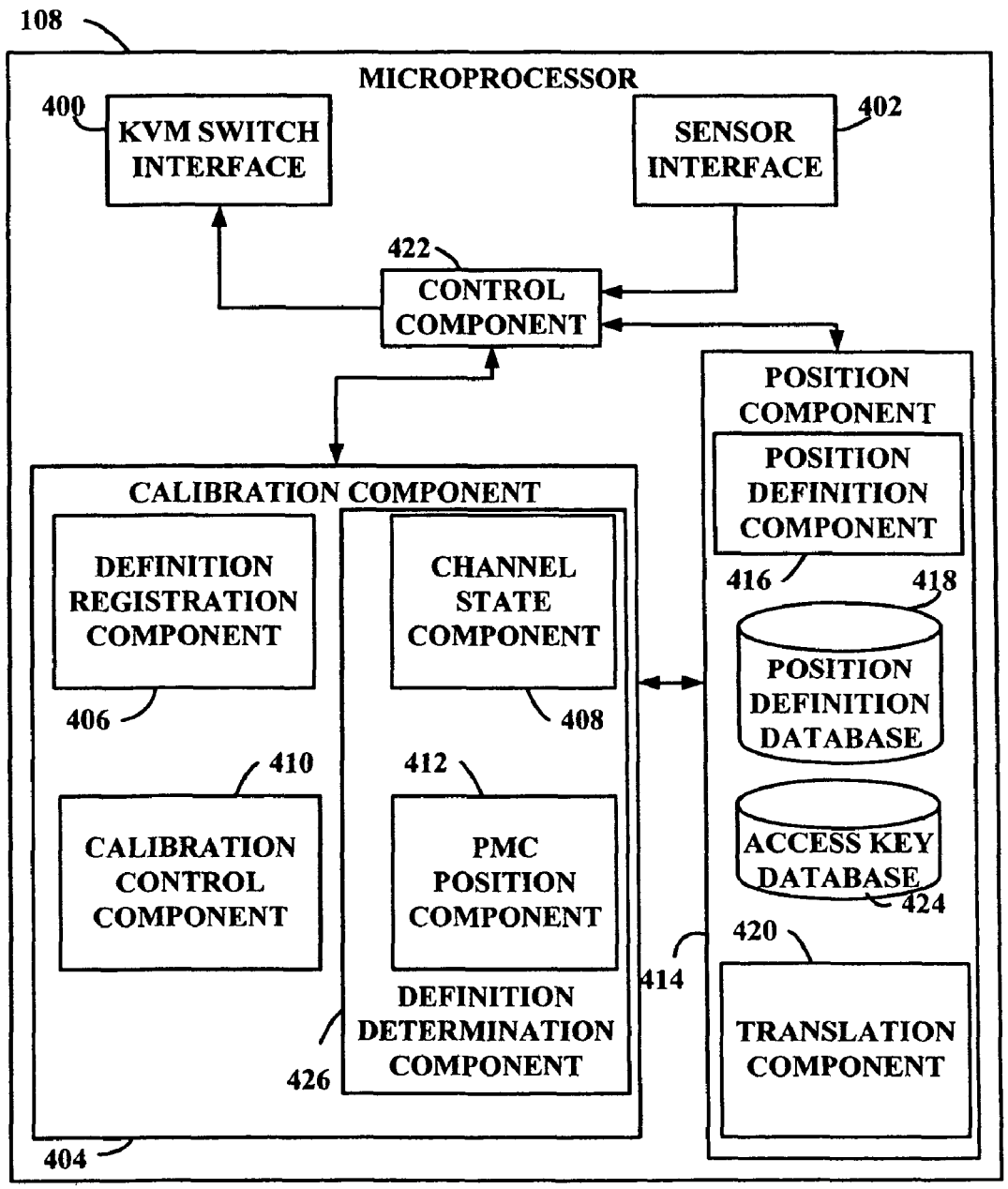
FIG. 4 illustrates the microprocessor of the position sensing system.

FIG. 4 illustrates the microprocessor 108 of the position sensing system 118 performing position sensing for operating the KVM switch 110.

The microprocessor 108 comprises a KVM switch interface 400, a sensor interface 402, a calibration component 404, a position component 414 and a control component 422. The KVM switch interface 400 interfaces with the KVM switch 110 to provide signals that invoke selection of one of the channels of the KVM switch 110. The sensor interface 402 interfaces with the sensor 106 for obtaining readings of the position of the position movable component 102.

The control component 422 manages overall flow of position sensing and changing KVM switch channel selection. The control component 422 obtains the sensor reading through the sensor interface 402 and provides it to either the calibration component 404 or the position component 414 according to the process being executed (either calibration or channel selection). The control component 422 controls activation of the calibration component 404 and the position component 414. When calibration is to be performed then the control component will activate the calibration component 404. When the channel is to be selected or the position of the position movable component 102 is to be assessed to determine whether a channel is to be changed, then the control component 422 activates the position component 414. Output from the position component 414 is provided to the control component 422 to be sent to the KVM switch 110 through the KVM switch interface 400.

The position component 414 determines a KVM switch channel that is to be activated based on the position of the position movable component 102 and position definitions. The position component 414 comprises a position definition component 416, a translation component 420, a position definition database 418 and an access key database 424.

The position definition database 418 holds the position definitions. The position definitions define the physical area associated with each channel of the KVM switch 110 in terms of the range of the sensor readings. Each entry in the position definition database 418 correlates a range of the sensor reading with one of the channels of the KVM switch 110.

The access key database 424 holds the access keys for each channel of the KVM switch 110. The entries in the access key database 418 provide an access key for each of the channels in the KVM switch 110.

The position definition component 416 determines a channel in the position definition database 418 that corresponds with a sensor reading. The position definition component 416 compares the sensor reading with the position definitions in the position definition database 418. Based on this comparison, the position definition component 416 identifies the position definition, and corresponding KVM switch channel, that most closely matches the sensor reading.

The translation component 420 determines the access key from the access key database 424 that will activate the appropriate channel. The translation component 420 receives an indication of the channel identified by the position definition component 416 and determines the access key in the access key database 424 for the channel. The translation component 420 then generates a signal that emulates the identified access key and provides it to the control component 422 to be sent to the KVM switch 110 through the KVM switch interface 400.

The calibration component 404 calibrates the position of the position movable component 404 against the position definitions. The calibration component 404 comprises a definition registration component 406, a calibration control component 410, and a definition determination component 426 and is in communication with the control component 422 and the position definition database 418 of the position component 414.

The calibration control component 410 manages the overall calibration process. At the start of the calibration process instructions are sent to the user of position the position movable component 102 in physical area of a particular channel to facilitate calibration. The control component 422 obtains the sensor reading through the sensor interface 402 after the instructions have been provided to the user.

The definition determination component 420 determines whether a specific position definition is to be calibrated. The definition determination component 420 comprises a channel state component 408 and a pmc (position movable component) position component 412.

The pmc position component 412 determines the state of the position of the position movable component 102. In particular, the pmc position component 412 determines if the position movable component 102 has been moved through it entire range of motion, or some other measure than indicates that the position movable component has moved but has returned to its original position. If the position movable component 102 is determined to have moved but returned to its original position, or moved through its full range of motion, then calibration is not required.

The channel state component 408 determines if there are channels that need to be defined or redefined. If all channels have been defined then calibration is halted as it is not required.

The definition registration component 406 registers the current sensor reading in the position definition database against the position definition for the current channel.

The previously described exemplary position movable component, detectable component and sensor combinations were provided by way of example. It should be understood that various other position movable components, detectable components and sensors could be suitably used without detracting from the scope of the position sensing control of the KVM switch.

It should also be understood that an existing KVM switch may be integrated with a position sensing controller provided in the form of the detectable component, the sensor, and the microprocessor. A custom KVM switch providing an integrated microprocessor and KVM switch may also be provided.

It is apparent to one skilled in the art that numerous modifications and departures from the specific embodiments described herein may be made without departing from the spirit and scope of the invention.

The invention claimed is:

1. A method for controlling the selection of channels in a keyboard video mouse (KVM) switch having a plurality of channels according to a position of a position movable component, the method comprising:
   providing a plurality of devices in communication with the KVM switch through one each of a plurality of KVM switch channels;
   correlating one of a plurality of position definitions of the position movable component with the KVM switch channel of each of the plurality of devices as a function of an orientation of the position movable component toward a physical location of the correlated device;
   receiving a current sensor reading indicating a current position of the position movable component, each position of the position movable component being associated with one of the plurality of channels;
   identifying one of the plurality of channels corresponding to the current sensor reading based on one of a plurality of position definitions, each of the plurality of position definitions providing sensor readings corresponding to the positions associated with one of the plurality of channels;
   generating a signal for selecting the identified correlated channel at the KVM switch;
   transmitting the signal to the KVM switch;
   determining a number of active channels;
   determining if a position definition has been created for each of the number of active channels; and
   determining if the sensor readings for the plurality of position definitions are to be revised according to a change in a current sensor reading of one of the position definitions, determining that a new channel has been added, or if a position of the position movable component is not detectable.

2. The method according to claim 1 further comprising:
   providing a user with instructions to place the position movable component in a position associated with one of the plurality of channels, if the sensor readings for the plurality of position definitions are to be revised;
   determining if the position definition for the one of the plurality of channels is to be revised, if the sensor readings for the plurality of position definitions are to be revised; and
   associating a sensor reading, obtained after the instructions are provided to the user, with the position definition for the one of the plurality of channels, if the sensor readings for the plurality of position definitions are to be revised.

3. The method according to claim 1 wherein the step of identifying comprises:
   comparing the current sensor reading with the sensor readings for the plurality of position definitions to identify a corresponding sensor reading and the associated one of the plurality of channels.

4. A method for controlling the selection of channels located at spaced locations from a receiving device and its associated equipment in a keyboard video mouse (KVM) switch having a plurality of channels according to a position of a position movable component, the method comprising:
   providing a plurality of devices in communication with a KVM switch through one each of a plurality of KVM switch channels; and
   providing a program contained in a memory associated with a programmable device, the program causing the programmable device to perform the steps of:
   receiving a current sensor reading indicating a current position of the position movable component, each current position of the position movable component being associated with one each of a plurality of position definitions, each of a plurality of position definitions correlated with one of the plurality of KVM switch channels as a function of an orientation of the position movable component toward a physical location of a one of the plurality of devices in communication with the correlated channel;
   identifying one of the plurality of channels corresponding to the current sensor reading based on one of the plurality of position definitions, each of the plurality of position definitions providing sensor readings corresponding to the positions associated with one of the plurality of channels;

generating a signal for selecting the identified correlated channel at the KVM switch;

transmitting the signal to the KVM switch;

determining a number of active channels;

determining if a position definition has been created for each of the number of active channels; and determining if the sensor readings for the plurality of position definitions are to be revised according to a change in a current sensor reading of one of the position definitions, determining that a new channel has been added, or if a position of the position movable component is not detectable.

5. The method according to claim 4, wherein the program contained in the memory further causes the programmable device to perform the steps of:

providing a user with instructions to place the position movable component in a position associated with one of the plurality of channels, if the sensor readings for the plurality of position definitions are to be revised;

determining if the position definition for the one of the plurality of channels is to be revised, if the sensor readings for the plurality of position definitions are to be revised; and associating a sensor reading, obtained after the instructions are provided to the user, with the position definition for the one of the plurality of channels, if the sensor readings for the plurality of position definitions are to be revised.

6. The method according to claim 4, wherein the program contained in the memory further causes the programmable device to perform the step of comparing the current sensor reading with the sensor readings for the plurality of position definitions to identify a corresponding sensor reading and the associated one of the plurality of channels.

* * * * *